United States Patent [19]

Martin

[11] Patent Number: 5,548,283
[45] Date of Patent: Aug. 20, 1996

[54] INTEGRATED CONTROL SYSTEM FOR PREPARING AND DEPLOYING SOUNDING DEVICES AND MANAGING TELEMETRY THEREFROM

[75] Inventor: Charles L. Martin, Boulder, Colo.

[73] Assignee: University Corporation for Atmosphere Research, Boulder, Colo.

[21] Appl. No.: 332,353

[22] Filed: Oct. 31, 1994

[51] Int. Cl.⁶ ................................................. G08C 19/16
[52] U.S. Cl. .................... 340/870.01; 340/601; 244/1 TD
[58] Field of Search ............................... 340/870.1, 601, 340/870.17; 73/170.28; 244/1 TD, 24, 31, 33, 63, 98, 110 R, 115, 189, 190

[56] References Cited

U.S. PATENT DOCUMENTS 5,186,418  2/1993  Laruitsen ............................... 244/138
5,470,032  11/1995  William, Jr. et al. ................. 244/1 TD

OTHER PUBLICATIONS

News letter "Vaisala News", vol. 131, published late 1993, recieved by Assignee on Jan. 28, 1994, p. 8–11 and 12–13.

Primary Examiner—John K. Peng
Assistant Examiner—Timothy Edwards, Jr.
Attorney, Agent, or Firm—Duft, Graziano & Forest, P.C.

[57] ABSTRACT

An integrated control system for use with an atmospheric sounding device and a telemetry receiving system. The control system controls sounding device preparation and deployment for semiautomated preparation that is operator assisted, or fully automated preparation that is periodically assisted. Deployment is fully automated and accomplished by local or remote terminal, time delay, or user input command. The control system receives and manipulates telemetry received by way of a telemetry receiving system that automatically tracks a transmitting sounding device, or is manually directed toward a transmitting sounding device by user input command. Prior to the present invention, sounding device preparation and deployment was a manual labor intensive process requiring more than one operator and subject to failure and inconsistent telemetry.

20 Claims, 8 Drawing Sheets

| | | DATA STORE PLATFORMS | | |
|---|---|---|---|---|
| CODE | PLATFORM NAME | DATA TYPE | STATUS | FORMAT |
| DS1 | /FLIGHT/RAW/MET | RAW PTU | PERMANENT | ASCII |
| DS2 | /FLIGHT/RAW/NAV | RAW NAVAID | PERMANENT | ASCII |
| DS3 | /FLIGHT/VIRTUAL/MET | VIRTUAL PTU | TEMP | BINARY |
| DS4 | /FLIGHT/VIRTUAL NAV | VIRTUAL NAVAID | TEMP | BINARY |
| DS5 | /FLIGHT/VIRTUAL/SURF | VIRTUAL SURFACE | PERMANENT | ASCII |
| DS6 | /FLIGHT/1SEC | MAIN 1 SECOND | PERMANENT | BINARY |

*FIG. 8*

INTEGRATED CONTROL SYSTEM FOR PREPARING AND DEPLOYING SOUNDING DEVICES AND MANAGING TELEMETRY THEREFROM

CROSS REFERENCE TO RELATED APPLICATIONS

The following application titled "FACILITY FOR PREPARING AND DEPLOYING SOUNDING DEVICES" Ser. No. 08/332,354 and "LOW COST TELEMETRY RECEIVING SYSTEM" Ser. No. 08/331,808 are related to the present application and were each filed on Oct. 31, 1994.

FIELD OF THE INVENTION

This invention relates to sounding systems and, in particular, to an integrated control system for preparing and deploying sounding devices and managing the telemetry therefrom.

PROBLEM

It is a problem to provide a control system that integrates and automates the preparation and deployment of sounding devices so that one operator can prepare and deploy a sounding device in addition to collecting and manipulating the telemetry received during the sounding. Soundings are useful in scientific and military applications relating to the oceanographic, geologic, and atmospheric sciences. While soundings performed in each discipline presents unique preparation and deployment problems, the control system of the present invention is applicable to the common need for automated soundings. In order to simplify the description of the problem and solution relating to the present invention, without limiting the application of the present invention, the remaining discussion will focus on the preparation and deployment of atmospheric sounding devices and managing the telemetry therefrom.

Atmospheric soundings are obtainable by numerous techniques although balloons have been the standard vehicle for deploying sounding devices from coordinated locations around the world twice daily for more than 50 years. However, preparing and deploying a balloon and its accompanying sounding device payload is a labor intensive and sometimes complex multi-step process even in ideal conditions. Due to the weather, equipment type or manufacturer, and human operator variables that can affect a successful atmospheric sounding, automating the multi-step process of preparing and deploying sounding devices increases the efficiency and consistency of preparation and deployment, facilitates single operator or remote preparation and/or deployment, and reduces the opportunity for failed soundings.

Early techniques for preparing and deploying sounding devices by balloon required two to three individuals working in an open field. To prepare the equipment, one person would prepare the sounding device itself while the second and third persons would inflate the balloon and secure the sounding device to the balloon by a tether. Deploying the sounding device required that two persons stabilize and then release the balloon, while a third person ran along behind the balloon with the sounding device in hand until the balloon reached a height equal the length of the tether. At the full length of the tether, the third person would release the sounding device to prevent damaging the sounding device if it were to bounce or be dragged along the ground. While the specific steps required to prepare the sounding device can vary from device to device, the procedure requires attention to the order of executing the steps which include, but are not limited to, wetting the battery, enclosing the battery, calibrating the telemetry sensing and transmitting apparatus, conditioning the device with ambient air, securing the sounding device to the balloon, and testing telemetry reception from the sounding device. Steps in preparing a balloon can vary depending on the size and type balloon, as well as the gas therein, the weather conditions at the deployment site, and the intended payload size.

More recent techniques for preparing and deploying sounding devices by balloon include a simple shelter where the balloon inflation and sounding device preparation is completed inside the shelter. Deploying the sounding device, however, is the same open field process as described previously where two persons stabilize and release the balloon while a third person runs along behind with the sounding device in hand to prevent it from being damaged if it were to bounce or be dragged along the ground. However, similar to the previously described preparation and deployment techniques, the present technique is labor intensive and can require from two to three operators to complete. Therefore it is desirable to have an automated facility for preparing and deploying sounding devices so that a single operator can successfully prepare and deploy a sounding device in real time or in preparation for an unattended timed deployment.

It is a further problem to obtain and manage the telemetry from a sounding device following deployment. Obtaining telemetry involves receiving a transmission from the sounding device as it wanders in the local area on prevailing winds. Telemetry receiving systems range from hand held antennas pointed in the direction of the sounding device, to high gain radar style dish antennas that project a symmetrical beam over a large area of space and track the sounding device by pinpointing its location in three-dimensional space. In either case, the telemetry receiving systems are operated as a non-integrated system from the preparation and deployment facility or its control systems, and the data received is typically recorded and displayed in cumbersome formats that are not done in real time.

Present techniques for managing telemetry from a sounding device consists of recording and displaying raw data in table format. Data displays are often made available on paper only rather than video or computer terminal displays. Raw data includes basic pressure, temperature, and humidity measurements, and other derivative data values are subsequently calculated as a post processing step rather than in real time. While telemetry is presently available within hours of each sounding, the delayed availability and difficult to read data display formats are typical and undesirable scenarios for the reasons stated above.

SOLUTION

The above described problems are solved and a technical advance achieved in the field by the integrated control system for preparing and deploying sounding devices and managing telemetry therefrom. The present control system integrates the steps and processes required to prepare and deploy a sounding device tethered to a balloon, in addition to the steps and processes required to receive, store, and display telemetry from the sounding device and manipulate the antenna receiving the telemetry. Integrating the above named steps and processes into one control system facilitates semi-automated or fully automated atmospheric soundings by a single operator whether or not the operator is present during each deployment.

A structure located at the deployment site is used to prepare and deploy the sounding device. The structure is of a modular design so that it is easily constructed and transportable. A balloon restraint is mounted within the structure just below a rooftop opening through which the sounding device is deployed. The rooftop opening has a retractable cover that seals the opening when the cover is in the closed position and uncovers the opening when the cover is in the open position. All preparation steps prior to deployment can occur whether the cover is in its open or closed position.

Preparation steps for the balloon include, but are not limited to, setting the releasable restraint, inflating the balloon within the bounds of the restraint, and sealing the inflation opening in the balloon. The specific steps and the order of steps needed to prepare the balloon may vary depending on the size and type of balloon and the gas therein. Preparing the sounding device requires attention to the order of executing the steps which include, but are not limited to, wetting the battery, enclosing the battery, calibrating the telemetry sensing and transmitting apparatus, conditioning the device with ambient air, securing the sounding device to the balloon, and testing telemetry reception from the sounding device. Controlling the preparation of the balloon and sounding device based on the type and size of equipment used, and the scientific requirements of the sounding, facilitates semi-automated preparation by stepping the operator through the process required by the equipment being used. Alternatively controlling the preparation steps also facilitates fully automating the preparation steps whether an operator is present or not.

Integrating the deployment steps into the control system's process control includes operating the retractable cover at the appropriate time prior to deployment, automatically releasing the balloon restraint, and closing the retractable cover at a predetermined time, on user input command, or when telemetry is received indicating the sounding device has cleared the structure.

Managing telemetry received by the telemetry receiving antenna subsequent to deploying the sounding device includes the ability to manually orient the antenna by user input command, receive and store raw data, derive subsequent data from the raw data, and display any combination or superimposed arrangement of raw data and derived data in real time as the sounding proceeds or as a delayed playback. The control system provides facilities to display in any graphical color format including, but not limited to, graph charts, cartesian, and polar coordinate type display.

By integrating the various stages of an atmospheric sounding including the preparation and deployment of the sounding device, and managing the telemetry therefrom, the present control system facilitates semi-automated and/or fully automated atmospheric soundings whether or not an operator is present at the deployment site. The result of using the control system reduces error in performing soundings, reduces the number of operators needed at each deployment site, and increases the efficiency and consistency of the operator at a deployment site.

DETAILED DESCRIPTION

The integrated control system of the present invention functions to control and/or automate sounding device preparation and deployment, in addition to receiving and processing telemetry obtained during deployment. Prior to the present invention, sounding device preparation and deployment was a labor intensive process requiting more than one operator. Further, automated or semi-automated portions of existing preparation and deployment systems are not integrated by a single control system that also included a telemetry receiving system and the associated processing of telemetry received during deployment.

Overall Sounding System Architecture

Figure 1:
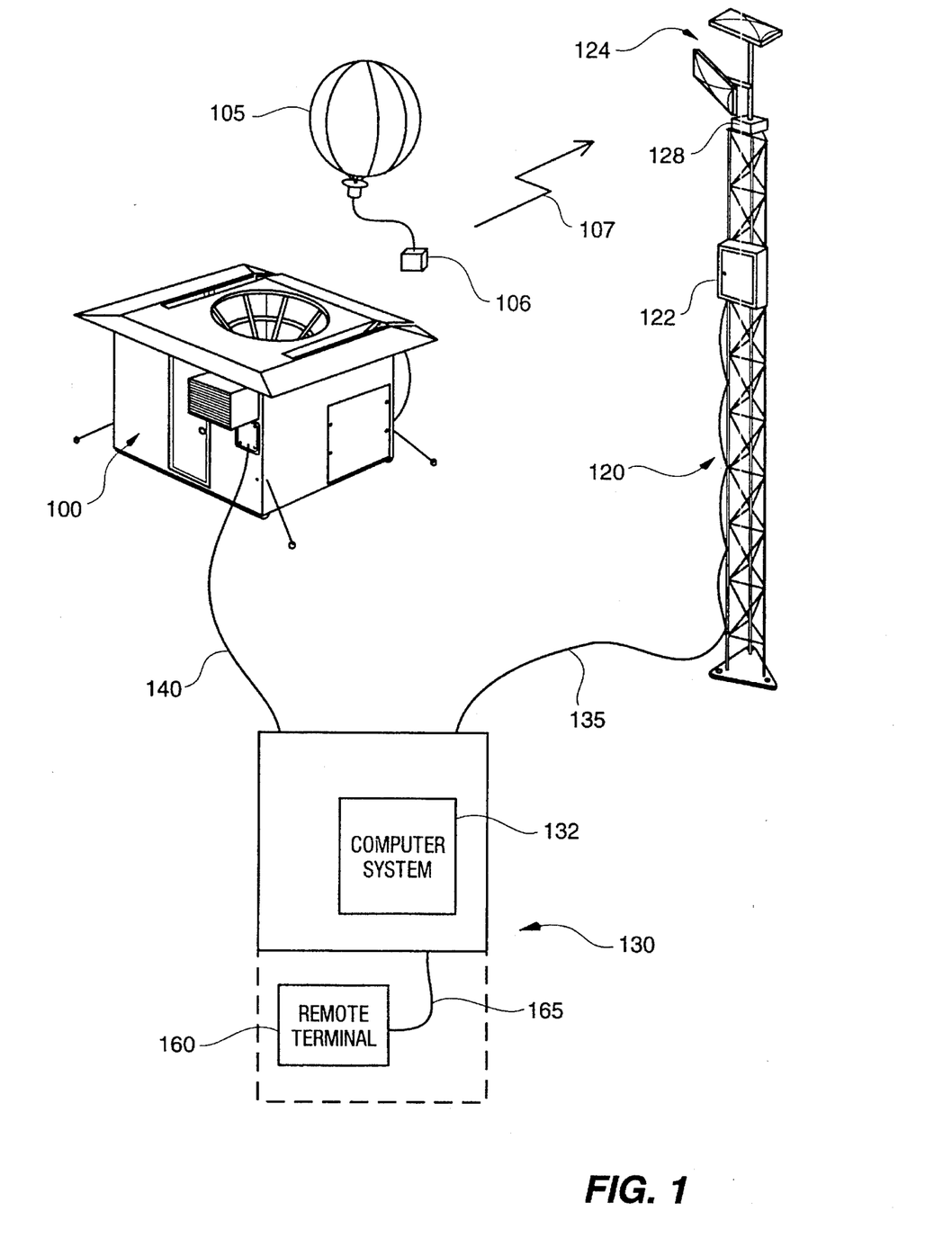
FIG. 1 illustrates the sounding system components.

FIG. 1 illustrates the overall sounding system architecture of the present invention. This illustration and any subsequent illustration serves only as an example of the present invention and not a limitation. As illustrated, the integrated control system 130 is connected by communication links 140 and 135 to a shelter 100 and a telemetry receiving system 120 respectively. The control system 130 includes the necessary hardware and software components to automate all sounding system functions by a computer system 132 or a remote terminal 160 connected to computer system 132 by remote communication link 165. The shelter 100 contains all necessary equipment for preparing and deploying a balloon 105 and sounding device 106 for use in an atmospheric sounding. The telemetry receiving system 120 includes an antenna configuration 124 mounted on an azimuthally rotatable platform 128, and a controller box 122 containing a signal amplifier, signal sensing controller, and platform rotor controller. In operation, the integrated control system 130 controls the shelter 100 operations for preparing and deploying a balloon 105 and sounding device 106, and the subsequent telemetry 107 transmitted by sounding device 106 and received by the telemetry receiving system 120. Processing and displaying the telemetry 107 as raw data and deriving subsequent values therefrom, occurs during and following the deployment.

The remote terminal 160 allows an operator to remotely manipulate the integrated control system and monitor the preparation and deployment status at the deployment site such as in shelter 100 that does not have an extension shelter to house the integrated control system main console or the main console is not conveniently accessible from within shelter 100. The remote terminal 160 enables a single operator to verify that all systems are functioning without having to leave the immediate deployment site, thereby making more efficient use of preparation and deployment time. Further, the remote terminal 160 allows an operator to remotely initiate a balloon release, and abort an pending deployment or a deployment in progress where an emergency arises.

Facility For Preparing and Deploying Sounding Devices

Figure 2:
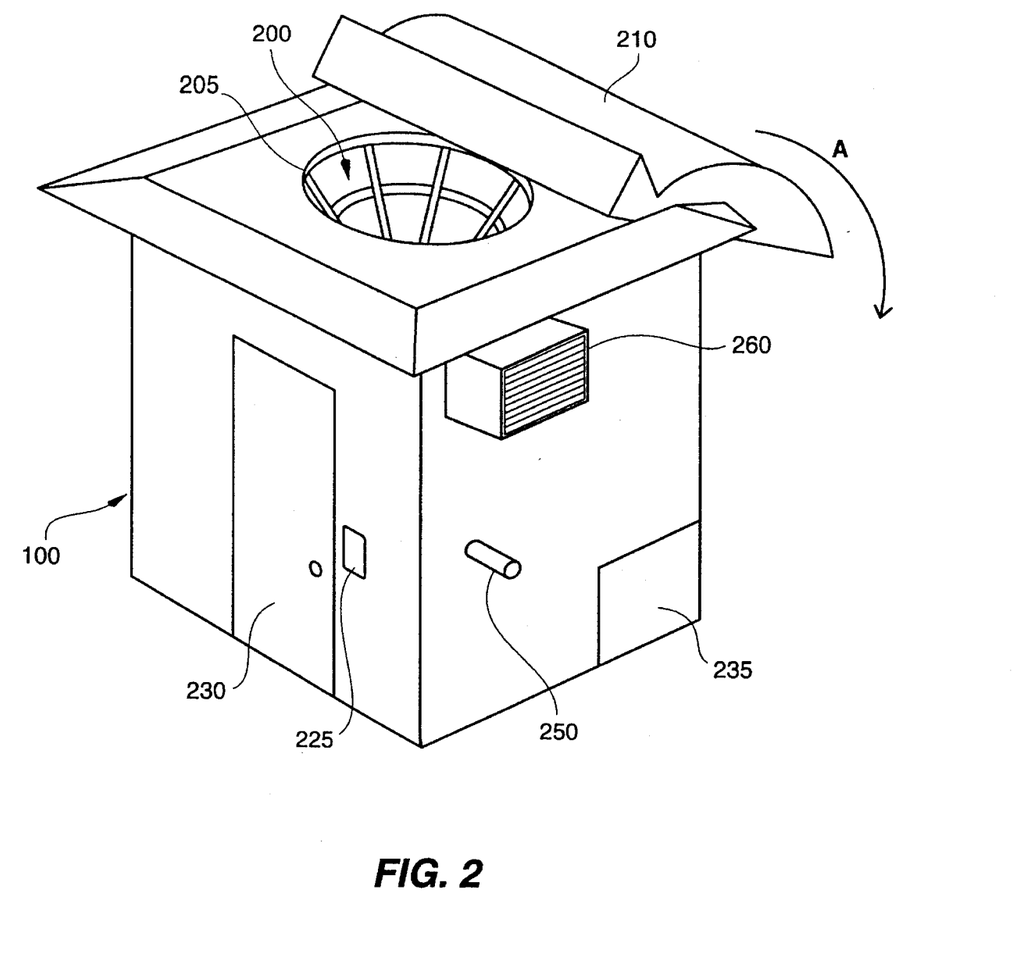
FIG. 2 illustrates the preparation and deployment facility.
Figure 3:
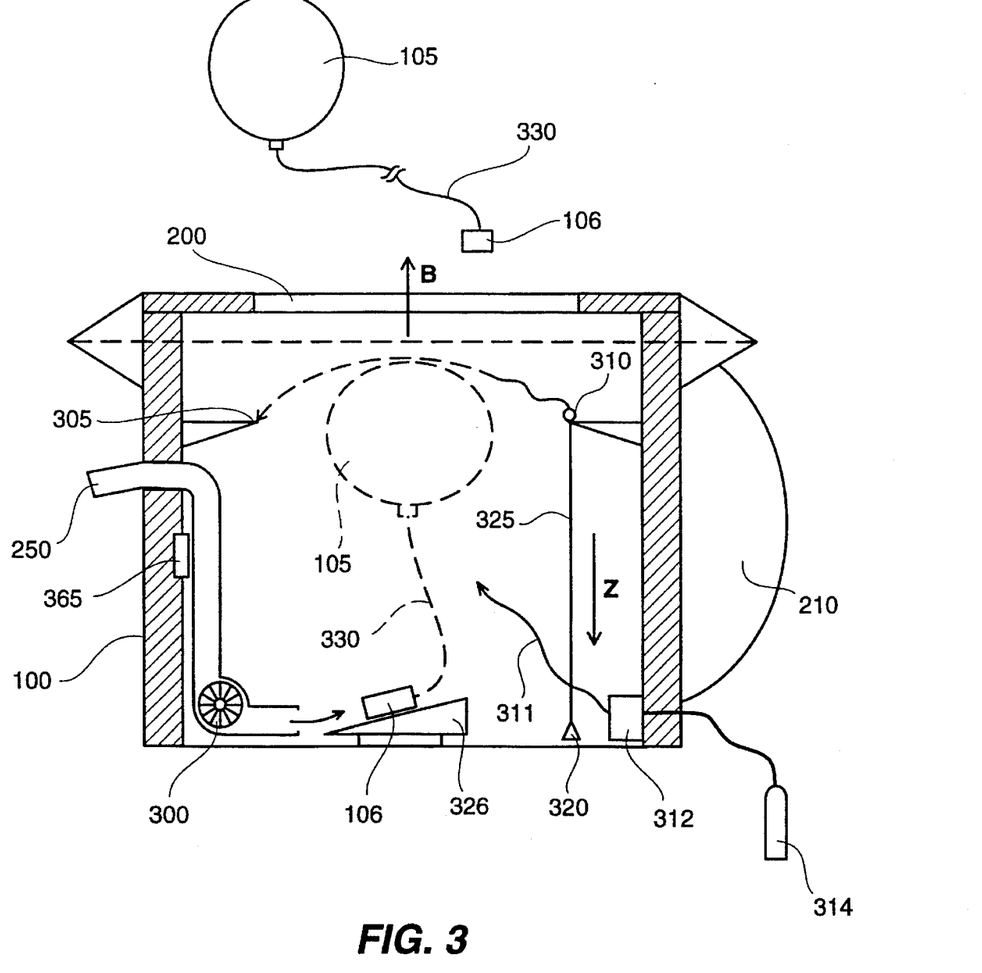
FIG. 3 illustrates a cross section view of a balloon and sounding device being prepared and deployed.
Figure 4:
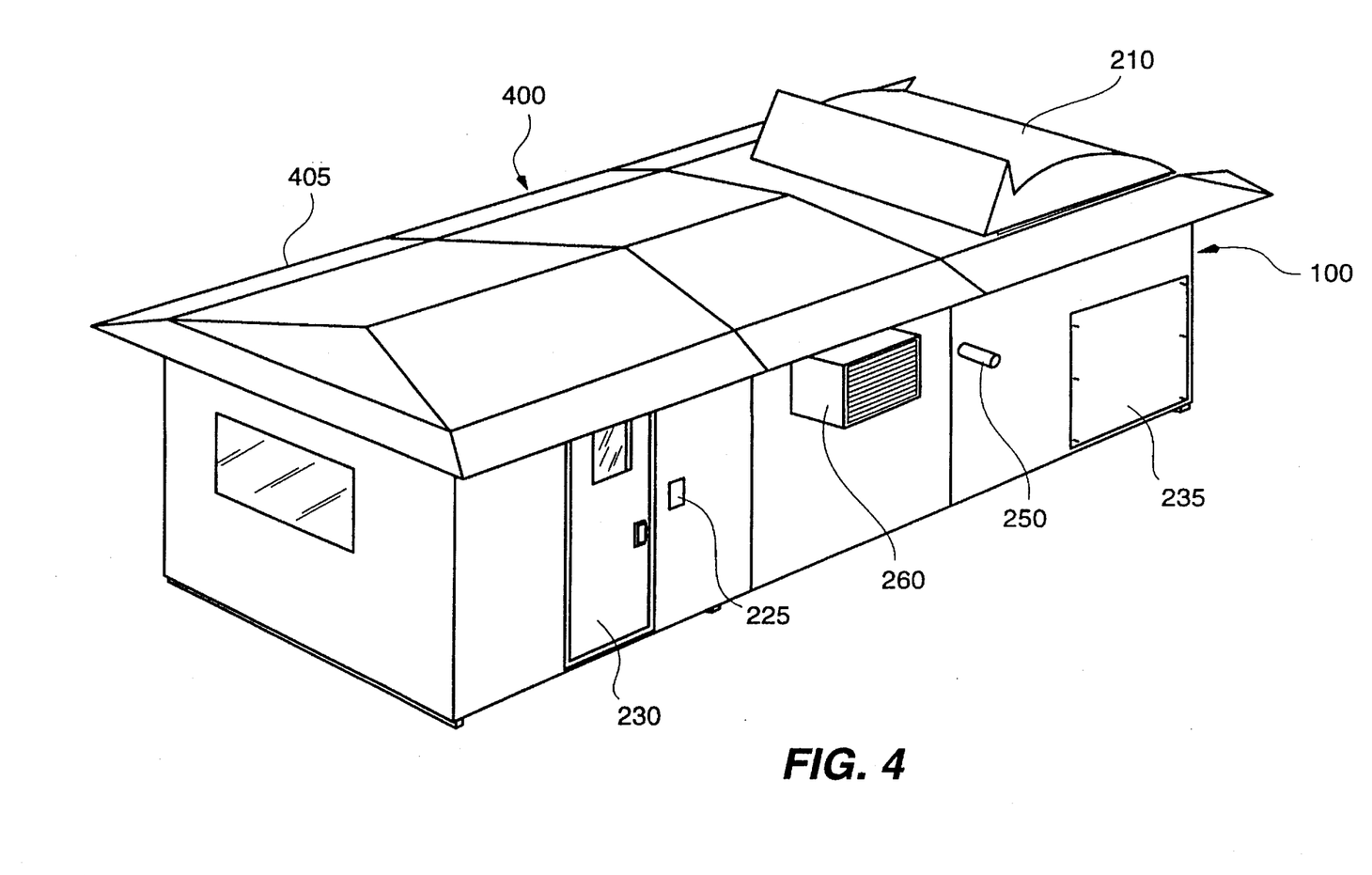
FIG. 4 illustrates extension shelters for the integrated control system.

FIGS. 2, 3, and 4 illustrate the facility for use in preparing and deploying sounding devices. A structure 100 contains all equipment needed for preparing and deploying sounding devices. Portions of structure 100 and its contents that are subject to control by control system 130 include, but are not limited to, cover 210, ambient air distributor 300, balloon restraint anchor/release 305, inflation station 312, sounding device calibration 325, environmental systems 260, and security system 225.

In FIG. 2, the cover 210 is mechanically operated and functions to uncover opening 200 by moving in direction "A" toward a resting point along the back wall (not shown). To cover opening 200, the cover 210 moves opposite direction "A" until directly overhead opening 200 and in contact with the opening seal 205. Access door 235 provides access to mechanical parts that operate cover 210 in addition to electrical connections, transformers, and/or batteries that supply power to structure 100. Environmental control unit 365 controls lighting and temperature for structure 100 occupants, and is programmable by methods well known in environmental controller art or by the integrated control system 130. Security system 225 controls access to structure 100 by entryway 230 in any number of techniques including, but not limited to, keypad code, voice recognition, or magnetic encoding. Security system 225 is programmable by a keypad at or near the system 225, or by the integrated control system 130, and the system may also control fire, water, and alarm systems and their accompanying sensors within and around structure 100. Ambient air intake 250 provides external ambient air for conditioning a sounding device to external conditions as discussed in the text for FIG. 3.

FIG. 3 illustrates a cross section of structure 100 and the essential elements for preparing and deploying balloon 105 and sounding device 106. Preparing balloon 105 and sounding device 106 can occur with cover 210 in its open or closed position. To prepare balloon 105, balloon restraint 325 is threaded through restraint anchor 310 and secured in restraint anchor/release mechanism 305. Restraint weight 320 provides sufficient weight to maintain tension on restraint 325 so that an inflated balloon 105 is held in place and so that restraint 325 can be rapidly pulled clear of balloon 105 when restraint anchor/release mechanism 305 releases restraint 325, thereby allowing weight 320 to fall in direction "Z" with restraint 325 in tow. Restraint anchor/release mechanism 305 is controllable by the integrated control system 130.

Inflating balloon 105 is accomplished by using inflation hose 311 from inflation station 312 to the balloon 105 with the desired quantity and type of lighter-than-air gas. Inflation station 312 contains a meter and flow regulator controllable by integrated control system 130, and provides the precise amount of gas required for the type and size balloon, and the weight, altitude, and scientific requirements dictated by the sounding device 106. Precisely controlling gas usage also makes efficient use of available gas where structure 100 is located in a remote area making tank farm 314 resupply difficult.

Preparing sounding device 106 varies depending on the type and manufacturer of the device, and attention to the order of executing preparation steps is required. Preparing the sounding device is controlled by the integrated control system 130 and the steps include, but are not limited to, wetting the battery, enclosing the battery, calibrating the telemetry sensing and transmitting apparatus, conditioning the device with ambient air, securing the sounding device to the balloon, and testing telemetry reception from the sounding device. Conditioning sounding device 106 requires that external ambient air be drawn through ambient air intake 150 by air circulator 300, and blown onto sounding device 106 so that the device reports true readings immediately upon deployment rather than several meters beyond as the device becomes naturally acclimated. Calibrating and testing sounding device 106 to determine that telemetry is being properly transmitted and received, is completed by calibration unit 326 through a physical connection to the sounding device or by remote transmission. Both the conditioning and calibration are controlled by integrated control system 130. As a final preparation step, the sounding device 106 is secured to balloon 105 by tether 330.

Deploying the sounding device 106 is accomplished by switching on power to the sounding device 106, and signaling the appropriate command to retract cover 210 and release balloon restraint anchor/release mechanism 305 as discussed previously. The balloon 105 rises freely in direction "B" at roughly 5 meters per second while transmitting telemetry in route. If it is desirable to control the otherwise free ascent in order to collect more data at specific altitudes, ballast and an electronically controlled ballast release can be added to the sounding device payload. The ballast can be released in increments or all at one time as determined by a timer pre-set at sounding device calibration time, or by a transmission from the integrated control system 130 as the received telemetry reports the desired altitude or other conditions. Where the transmission from the integrated control system 130 is used, a pre-set timer backup can be included as a default in the event the transmission to the sounding device 106 fails. The pre-set timer is set based on the estimated time it would take for the balloon 105 to rise to a particular altitude. Finally, the pre-set timer and/or transmission from the integrated control system 130 can also be used to signal the sounding device 106 to release balloon 105 at a particular altitude and deploy a parachute or use other gliding or floating means so that further data can be collected as the sounding device 106 descends back to earth.

FIG. 4 illustrates shelter 100 with a first extension shelter 400 and second extension shelter 405 attached in series. The extension shelters are subject to the same environmental and security control system as described previously in FIG. 2. The number of extension shelters and their configuration are a matter of design choice, however, the shelter 100 by itself is considered transportable. The extension shelters provide additional sounding equipment storage space, operator quarters as needed, and space for electronic equipment related to the integrated control system 130.

Telemetry Receiving System

Azimuthally rotatable platform 128 in FIG. 1, is automatically controlled by a rotor controller in controller box 122. When functioning automatically, the telemetry receiving system 120 senses the signal strength of telemetry signal 107 from sounding device 106, and instructs the rotor controller in controller box 122 to rotate the antenna configuration 124 so that the receiving beam is directed at the point the signal is strongest. When the telemetry signal 107 is faint or otherwise lost, the integrated control system 130 can be used to override the automatic positioning system in controller box 122 so that the antenna configuration 124 is directed by user input command. The user input command can be input by techniques including, but not limited to, keyboard commands or by dragging a mouse pointer or cross-hair across a polar coordinate display screen in the desired direction of antenna movement. Where the polar coordinate display shows a zenithal view down toward earth mapping the sounding device's path during deployment, a user can direct the antenna configuration 124 toward the last known sounding device location in an attempt to maintain reception. Repositioning the antenna configuration 124 by user input command may be facilitated where the operator can establish visual contact with a "lost" sounding device.

Control System Hardware Architecture

Figure 5:
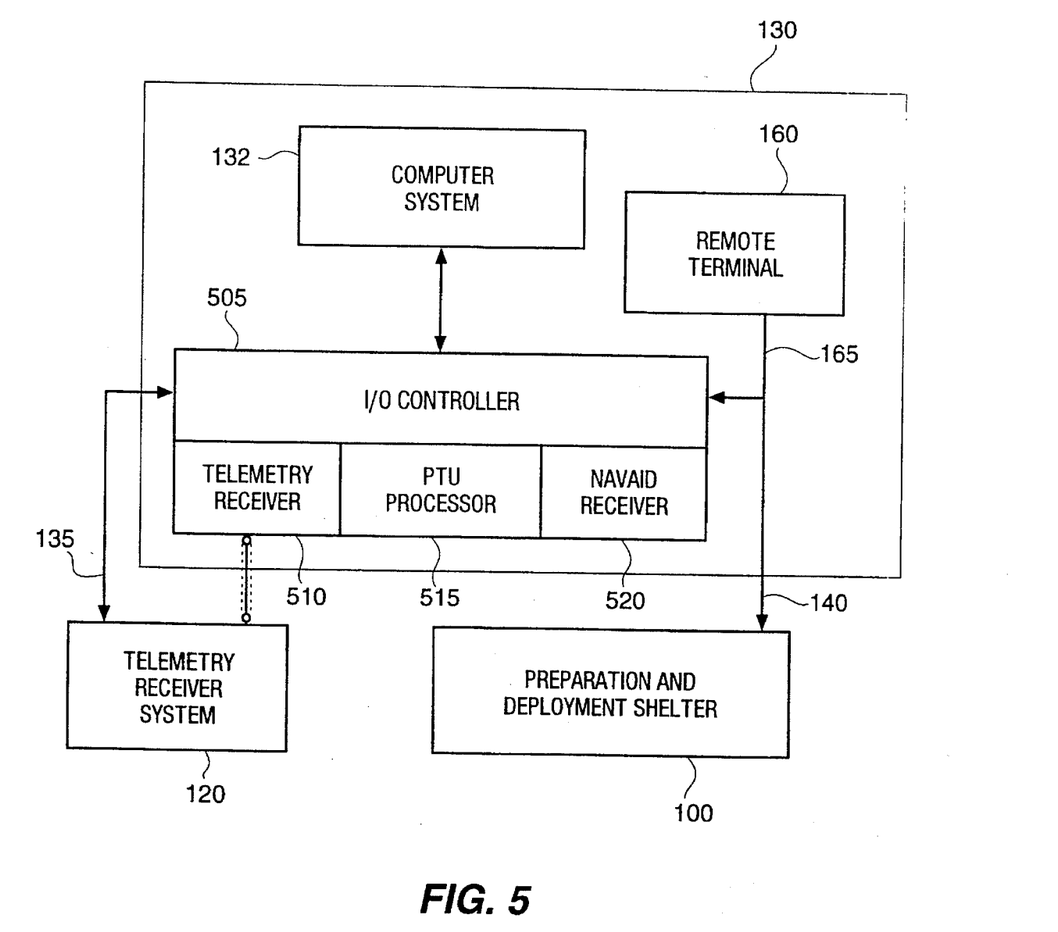
FIG. 5 illustrates the integrated control system in block diagram form.

FIG. 5 illustrates the overall integrated control system architecture 130 in block diagram form. The computer system 132 hardware can be any processor desired that will support high resolution display screens, large capacity disk and tape peripheral devices, and heavy scientific/math processing. In the preferred embodiment, a standard 32 bit UNIX based personal computer or workstation with math coprocessor, portable mass storage capability, graphics capable printer, and high-resolution VGA or SuperVGA display screen is used. Communications interfaces between the computer system 132 and input/output controller 505 are standard R-232 protocol serial port links. Ideally, dedicated serial ports are allocated to each device in communication with the computer system 132 so that multi-tasked data acquisition is possible. Serial ports are provided by individual plug compatible cards that install in the system bus of computer system 132 and each port is controlled by the standard low level interrupt-driven tty device drivers provided by the UNIX kernel. These device drivers regulate and buffer incoming character mode data to insure that no data is lost. The above described configuration is desirable because the UNIX base operating system widens the portability with respect to other applications and interfaces with alternative processor architectures and operating systems.

Input/output controller 505 is a standard communication controller well known in the art, and is the focal point for all R-232 serial communications between the computer system 132 and peripheral devices including, but not limited to, the telemetry receiver 510, pressure temperature and humidity (PTU) telemetry processor 515, and NAVAID receiver 520. Commands sent from computer system 132 to any given peripheral device 510, 515, and 520, pass through one R-232 port to the I/O controller 505 which establishes serial communications links to the appropriate device through one of three multiplexing circuits in the I/O controller 505. Each multiplexer can manage up to four serial devices. The first multiplexer serves PTU data processing, the second serves Navaid processing, and the third serves miscellaneous devices needing low duty cycle access.

Figure 6:
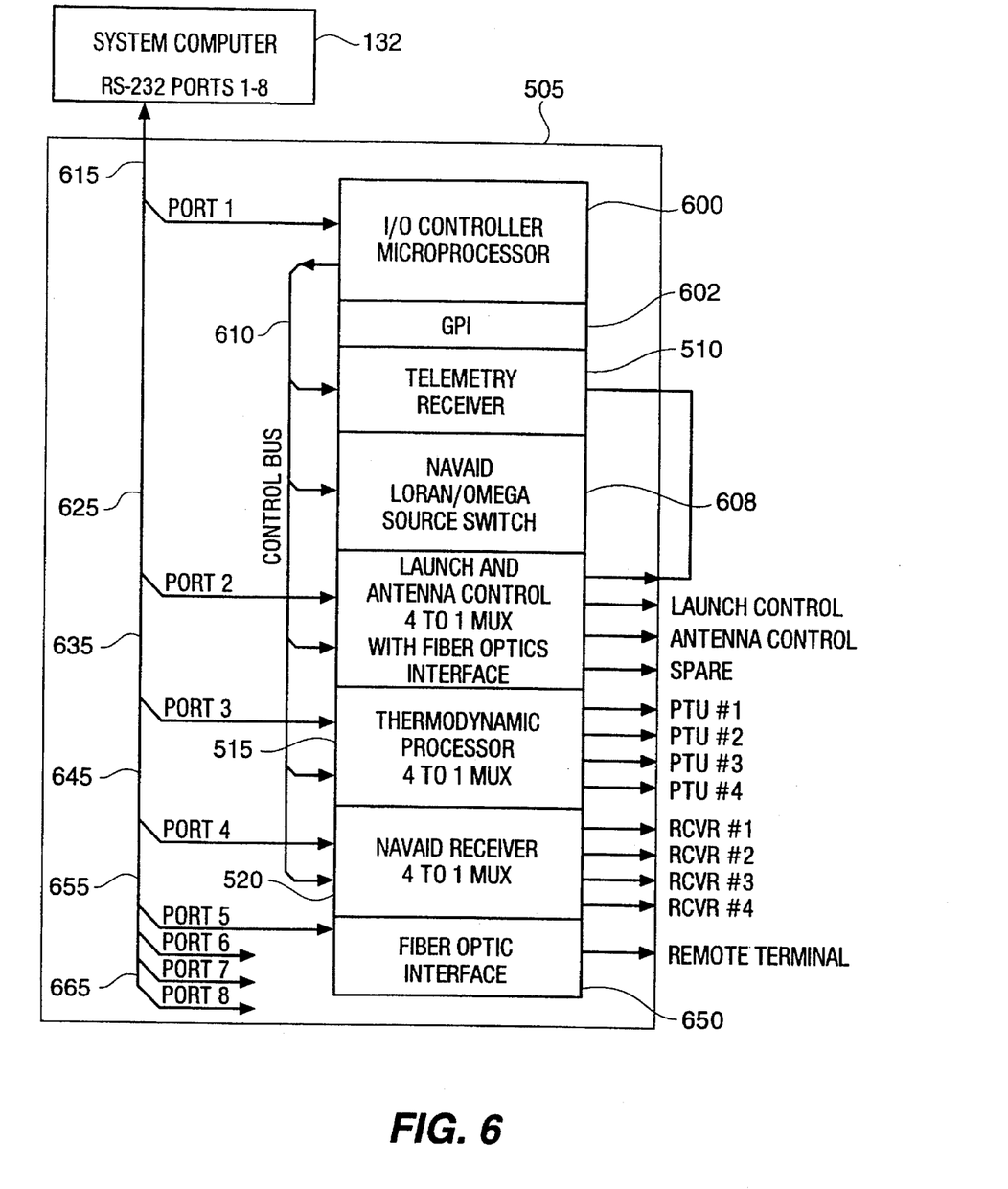
FIG. 6 illustrates the communications processes for the integrated control system.

FIG. 6 illustrates the communications connectivity of I/O controller 505. To select a particular device on one of the multiplexers, a pre-defined ASCII command is sent by the computer system 132 across the R-232 line for serial port 1 to I/O controller 505. The I/O controller 505 checks the validity of the command and makes the desired port connection on the appropriate multiplexer. The computer system 132 is then in communication with the device to control the device as needed. An 8 bit data control bus 610 controls all internal I/O controller 505 communications. General purpose interface 602 facilitates communications for computer system 132 system peripherals. Navaid Loran/Omega source switch 608 switches between local operation during sounding device 106 calibration and other preparation procedures, and remote operation at deployment time where the telemetry receiver 510 is connected to the telemetry receiving system 120 for normal telemetry receiving operation. Telemetry receiver 510 is a wide-band synthesized superheterodyne frequency modulated device for receiving telemetry from sounding device 106. Thermodynamic (PTU) processor 515 manages raw thermodynamic data including pressure (P), temperature (T), and humidity (U) data in addition to derivative data products therefrom. The Navaid receiver 520 provides wind finding by any mutually exclusive system well known in the art including, but not limited to, Cross-chain Loran C, and Omega. The sounding device 106 receives signals from triangulated ground stations during deployment, and the differences of signal arrival times are computed by the Navaid receiver to determine wind direction and speed.

Fiber optic interface 650 provides access to the remote control terminal 160 through fiber optic cable 165 for maximum distance and isolation. A mutual exclusion mechanism guarantees access by only the remote terminal 160 or the computer system 132 but never both. Alternatively, remote terminal access may be used provided by radio wave communications in place of or in addition to interface 650 as a matter of design choice. Spare serial ports 665 are available for such expansion.

Control System Software Architecture

Figure 7:
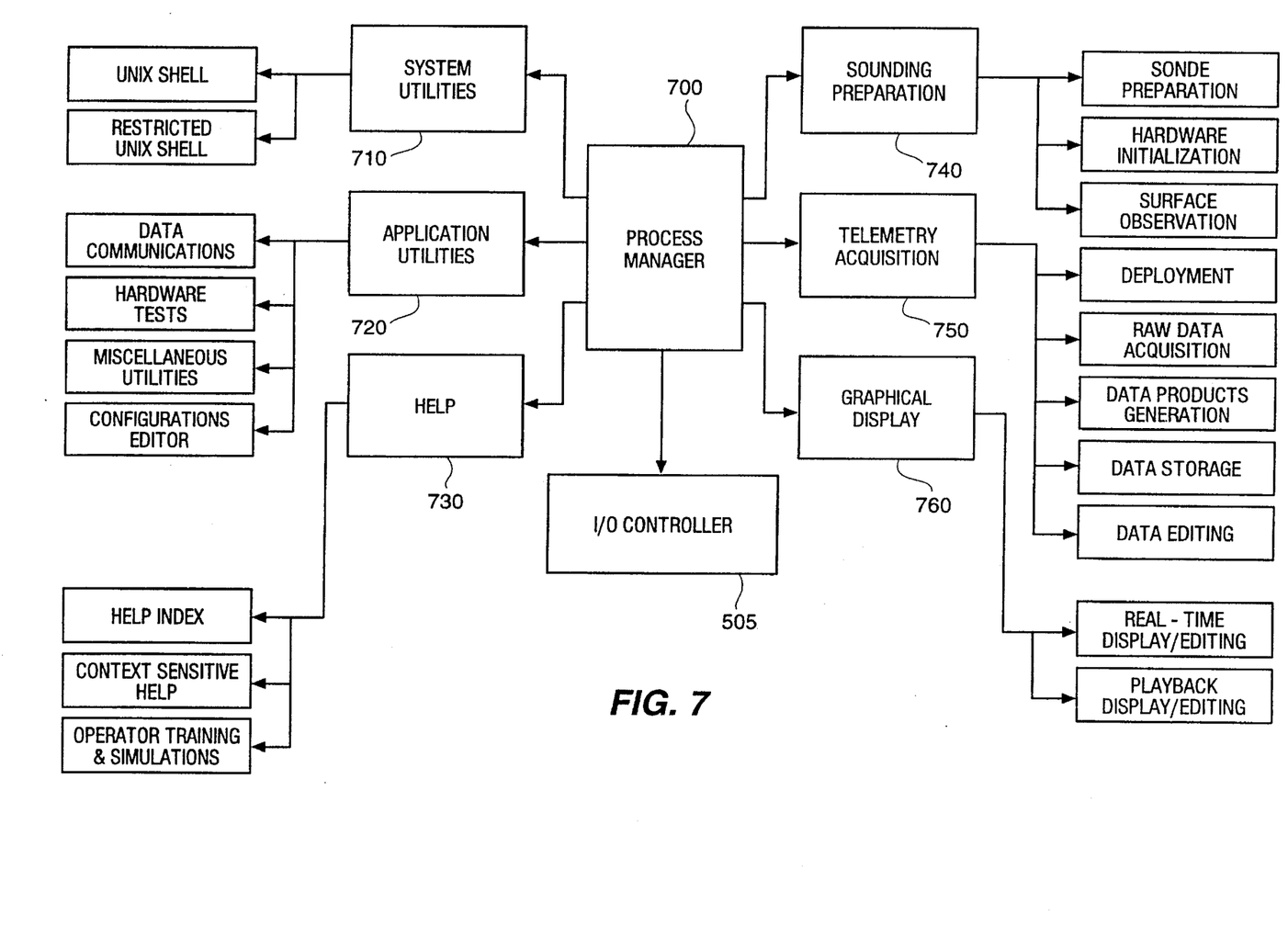
FIG. 7 illustrates the control system software architecture in block diagram form.

FIG. 7 illustrates the integrated control system software architecture's primary processes. The processes and the interprocess communications are managed by process manager 700 using standard interprocess communication protocols provided by any well known operating system architecture in the art. The type Operating system selected must accommodate real time processing with high input/output, math processing, and peripheral storage access demands. In the preferred embodiment, system utilities processes 710 are provided by a multitasking UNIX operating system with traditional kernel and shell architecture in order to simplify software design, implementation, maintenance, and portability with respect to the hardware base. Any of a variety of UNIX systems are available and workable for the present invention including, but not limited to, PC-based UNIX V/386 from Santa Cruz Operation, Interactive Systems UNIX, and Lynx OS/386AT UNIX, each of which supports the required networking support, device drivers, error recovery, maintenance, and windows environments. The system utilities 710 function as the intermediary between the remaining software architecture in FIG. 7 and the control system hardware 132 and provides system wide configuration and initialization for the integrated control system.

Application utilities manager 720 manages high level processes for the user by way of shell processing scripts to manage data store facilities, hardware test and maintenance, configuration editing, and other miscellaneous utility activities unique to the situation. Data store facilities manage all aspects of data access and archival by the core UNIX services and the client processes. Because the integrated control system 130 manages all hardware associated therewith, in addition to the sounding device 106, shelter 100, and telemetry receiving system 120, applications utilities manager 720 also coordinates and administers testing and test sequencing to assist in routine maintenance and debugging equipment problems. The configuration editor provides facilities for managing all configurable aspects of the system, some of which include hardware configurations, sounding equipment parameters, graphical display characteristics, data processing parameters, and data product definitions.

Applications help manager 730 provides a menu driven pop-up or drag-down online help index to access information requested by the user based on the context in which the help is needed. The index also identifies operator training instructions and simulations to assist in training new operators to use the integrated control system 130 and the sounding system facilities generally.

Input/output controller 505 functions as previously described in FIG. 5. An additional feature of I/O controller 505 is transmitting final data products resulting from any given sounding device deployment to a facility or laboratory located separate from the deployment site. While final data products may be delivered by physically carrying a tape or disk, the data may also be transferred by telephone line, satellite transmission, or any other available communications media or network. Communications interface for the telephone or satellite transmission are managed by the I/O controller 505 by connecting the appropriate hardware to one of the spare ports 665.

Sounding preparation manager 740 controls the stepwise execution of balloon 105 and sounding device 106 preparation as described previously. In a semi-automated implementation, the steps necessary to prepare a sounding device 106 are determined by the type of device and desired sounding requirements selected from a menu of sounding criteria selectable by the operator. Criteria input or selected by the operator to define a particular sounding include, but are not limited to, the type of data desired from the sounding, type of sounding device capable of satisfying the sounding requirements, and the type and size balloon capable of lifting the selected sounding device to a particular altitude at a particular number of meters per second. Once the sounding criteria is defined, the sounding preparation manager 740 displays a one way checklist of steps that must be executed and verified in order to deploy the sounding device. The steps include, but are not limited to, the quantity of gas required to properly inflate the balloon, the amount of water required for a wet cell battery, when the battery requires wetting for maximum life, sounding device calibration, sounding system hardware initialization, and ambient air conditioning with ambient air existing at the deployment site. All sounding device readings are verified by surface observations at the deployment site. Stepwise execution of the steps is enforced where necessary to ensure proper preparation, although, certain steps may be executed simultaneously or in any convenient order. A secured override may be executed to alter the order of executing stepwise enforced steps. The date, time of day for each preparation step, a step verification record, and operator identification are all recorded by the sounding preparation manager 740 for record and analysis purposes. For fully automated preparation, the above stepwise preparation is executed by an automated means under the sounding preparation manager 640 control rather than human operator. However, the selection of equipment and steps necessary for preparing the selected equipment remain as described above with optional human override capability where desired.

Telemetry acquisition manager 750 begins with deploying the sounding device 106 as discussed previously with FIG. 3. The command to retract cover 210 and release balloon restraint 325 held by restraint anchor/release mechanism 305, can be delivered by the remote terminal 160 or the telemetry acquisition manager 750 of the integrated control system 130, by setting a count-down timer, a time of day timer, or real time user input command. The raw data acquisition task is the interface between the telemetry receiver task implements the protocols required to communicate with data collection devices such as the telemetry receiver 510, the PTU processor 515, and the Navaid receiver 520, in order to read incoming data, assign a time stamp, construct a data object, and store the data in memory.

Figure 8:
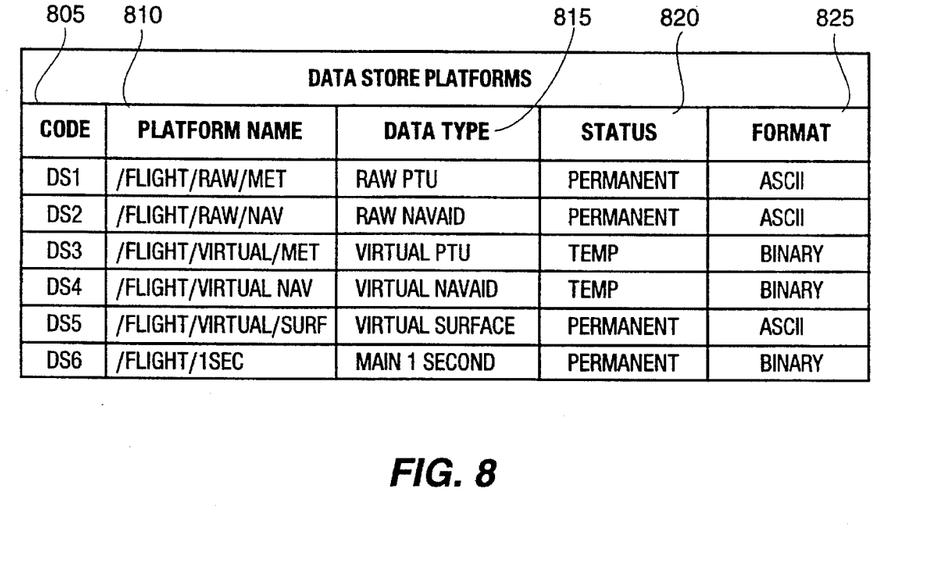
FIG. 8 illustrates the data store platforms for telemetry.

FIG. 8 illustrates the data store platforms used to organize incoming raw data read by the raw data acquisition task 652. Each data store platform is assigned a code 805 from DS1 through DSxx associated with a platform name 810. The /flight/ designation represents a particular deployment from a specific deployment site. The data type 815 indicates the source of the specific data as "raw" from a sounding device or navaid, or as "virtual" from subsequent processing of raw data. One second data is the smoothed raw data discussed below. Other data types may be added to designate the type data collected or derived. The status 820 indicates whether the data is stored permanently on a peripheral storage device or disappears when the main process terminates. The format field 825 indicates the low level file organization as between ASCII or binary bit files.

The data product generation task extracts raw data objects from memory to create final data products. All derivative data products are in some way tied to the fundamental raw data collected each second during a sounding. Raw data objects are frequently noisy or incomplete, such that smoothing and/or interpolation are required to alleviate these symptoms in the thermodynamic (PTU) or wind data. PTU data is smoothed, not averaged, across a short time interval pre-determined as optimum for the type sounding device being used. Raw PTU data is parsed and time stamped as it is input into the system in a circular buffer. Where time stamps in the buffer fail to meet an upper and lower time boundary, the data is processed by smoothing. Smoothing results in PTU data that is less affected by noise in the telemetry link and other variables occurring during transmission. The smoothing process involves fitting a least-squares fit to each PTU parameter across the time interval, prior to extracting each PTU parameter from the slope of the curve at each exact second required for the one second data set. The circular buffer is advanced by one second and the process continues again. The typical time interval requiring smoothing ranges from five to ten seconds. For sounding devices that carry an error correction code such as the Cyclic Redundancy Code (CRC), telemetry link noise errors are clearly definable so that smoothing is unnecessary.

Wind data smoothing is also computed by a least-squares technique similar to the PTU smoothing process. However, the wind data smoothing becomes more complex because it smooths time of arrival of navaid station signals across a larger time interval ranging from 30 seconds for Loran C signals, to 2 minutes for Omega signals.

The final data products and data storage task produces secondary derivative data products based on the raw (smoothed) data as required by the specific user needs. Examples of such products include, but are not limited to, refractive index, sonic speed, and equivalent potential temperature data. Other derivative products can be added by implementing the appropriate calculations as a further subtask. Data storage is accomplished by storing data store platforms in memory as discussed in the text accompanying FIG. 8.

Data editing facilities provides users the ability to edit desired data sets where there is known corruption and operator intervention is appropriate.

A graphical display task is an interactive (on demand) interface to the raw and virtual data that is collected, stored in memory, and/or calculated for a given sounding. All displays are capable of being displayed in real time during the sounding or as a post-sounding replay, on either a high resolution monitor or in snapshots on a high resolution printer. Depending on the printer capabilities, however, color representations may be lost or less effective on paper. The primary purpose of the graphical display task is to integrate and graphically display data in formats including, but not limited to, cartesian and polar coordinate forms, and other two or three dimensional chart formats. The data type, color representation, and graphical representation are user selectable and may be superimposed onto other data types as desired including time and altitude. Cartesian coordinate axis are user selectable with the default axis being time and altitude from the time of deployment at the deployment site altitude. Polar coordinate axis defaults are distance and direction with the deployment site being ground zero, and altitude being displayed by changes in color over the plotted path. As an alternative, a side window can be used to display raw data in table format overlaying a portion of a graphical display. Finally, portions of the graphical display may be stored on tape or disk as space permits, or on video tape for larger audience distribution or viewing. While specific embodiments of this invention are disclosed herein, it is expected that those skilled in the art can and will design alternate embodiments of this invention that fall within the scope of the following claims.

We claim:

1. An integrated control system for an upper-air sounding system wherein said upper-air sounding system includes a single structure for preparing therein and deploying therefrom a sounding device and a sounding device vehicle, and a telemetry receiving antenna for receiving telemetry from said sounding device, said integrated control system comprising:

means for storing parameters indicative of each of a plurality of sounding device types independent of each of a plurality of sounding device vehicle types in a memory that is accessible to said integrated control system;

means for selecting at preparation time any one of said plurality of sounding device types and any one of said plurality or sounding device vehicle types from said stored parameters;

means for generating a list of a plurality of tasks to prepare and deploy said sounding device of said selected sounding device type with said sounding device vehicle of said selected sounding device vehicle type in response to said means for selecting;

means for controlling manual execution of said plurality of tasks to prepare said sounding device and said sounding device vehicle for deployment wherein said plurality of tasks are executed inside said single structure;

means for restraining said sounding device vehicle within said single structure when said sounding device vehicle is fully prepared as indicated by completion of said plurality of tasks;

means for automatically deploying said sounding device via said sounding device vehicle from within said single structure; and means, responsive to said means for automatically deploying, for controlling said telemetry receiving antenna wherein said means for controlling includes:
means for automatically orienting said telemetry receiving antenna to receive said telemetry from said sounding device; and
means for overriding said means for automatically orienting said telemetry receiving antenna to manually orient said telemetry receiving antenna by a user input command to receive said telemetry from said sounding device.

2. The integrated control system of claim 1 including:

mean for all displaying a coordinate format that is real-time selectable by a user between a polar coordinate format and a cartesian coordinate format wherein said polar coordinate format includes a real-time orientation indicator of said telemetry receiving antenna orientation relative to said telemetry from said sounding device;

means for superimposing said coordinate format with a user selectable color coding of historic navigational data and real-time navigational data indicative of wanderings of said sounding device;

means for overlaying real-time raw thermodynamic data from said sounding device onto said coordinate format in a user selectable graphic form;

means for generating derivative data from said real-time navigational data and said raw thermodynamic data to correct errors and fill gaps in said real-time navigational data and said thermodynamic data; and means for integrating a said derivative data into said real-time navigational data and said thermodynamic data.

3. The integrated control system of claim 2 including:

means for displaying said raw thermodynamic data said real-time navigational data, and said derivative date in a user selectable time frame selectable between real-time and prerecorded playback.

4. The integrated control system of claim 1 including;

means for incrementally releasing ballast from said sounding device when in flight to alter the rate of ascent of said sounding device.

5. The integrated control system of claim 4 wherein said means for managing further includes:

means for controlling the post-deployment release of said sounding device from said sounding device vehicle during ascent to allow said sounding device to descend to Earth while transmitting telemetry.

6. The integrated control system of claim 1 wherein said means for controlling manual execution includes:

means for verifying completion of each task in said list of said plurality of tasks.

7. The integrated control system of claim 1 including:

remote controller means for remotely manipulating said integrated control system to automatically deploy said sounding device.

8. The integrated control system of claim 1 wherein said means for deploying includes:

means for scheduling said deployment of said sounding device based on an event selected from the group consisting of a predetermined length of time, an occurrence of an event, and an overriding real-time user command; and means, responsive to said means for scheduling said deployment, for deploying said sounding device.

9. The integrated control system of claim 1 including:

means for configuring said sounding device to communicate with said telemetry receiving antenna; and means for conditioning said sounding device to external ambient conditions prior to deployment when said sounding devices is fully enclosed within said single structure.

10. An integrated control system comprising:

means for controlling execution of a plurality of tasks inside a single structure to prepare a sounding device and a sounding device vehicle for a deployment wherein said means for controlling includes:
means for inputting a plurality of equipment parameters indicative of equipment used in a sounding;
means, responsive to said means for inputting, for defining a sequence of said plurality of tasks needed to prepare said sounding device for deployment;
means for calibrating said sounding device; and
means for verifying completion of each of said plurality of tasks in said sequence;

means for restraining said sounding device vehicle within said single structure when said sounding device vehicle is fully prepared as indicated by completion of said plurality of tasks;

means, responsive to said means for controlling execution of said plurality of tasks, for controlling deployment of said sounding device wherein said means for controlling deployment includes:

means for scheduling said deployment of said sounding device selected from the group consisting of a predetermined length of time, an occurrence of an event, and an overriding real-time user command;

means, responsive to said means for controlling deployment, for controlling reception of raw data transmitted from said sounding device wherein said means for controlling includes:

means for automatically orienting said telemetry receiving antenna to receive said telemetry from said sounding device; and means for overriding said means for automatically orienting said telemetry receiving antenna to receive said telemetry from said sounding device by a user input command;

means for displaying said raw data from said sounding device on a user selectable coordinate format wherein said user selectable format is selectable in real-time between a polar coordinate format and a cartesian coordinate format;

means for deriving at least one virtual data value from said raw data; and means for displaying said at least one virtual data value concurrently with said raw data in a user selectable time frame selectable between real-time and prerecorded playback.

11. A method for controlling an upper-air sounding system wherein said upper-air sounding system includes a single structure for preparing therein and deploying therefrom a sounding device and a sounding device vehicle, and a telemetry receiving antenna for receiving telemetry from said sounding device, said method comprising the steps of:

storing parameters indicative of each of a plurality of sounding device types independent of each of a plurality of sounding device vehicle types In a memory that is accessible to said integrated control system;

selecting at preparation time any one of said plurality of sounding device types and any one of said plurality of sounding device vehicle types from said stored parameters;

generating a list of a plurality of tasks to prepare and deploy said sounding device of said selected sounding device type with said sounding device vehicle of said selected sounding device vehicle type in response to said means for selecting;

controlling manual execution of said plurality of tasks to prepare said sounding device and said sounding device vehicle for deployment wherein said plurality of tasks are executed inside said single structure;

restraining said sounding device vehicle within said single structure when said sounding device vehicle is fully prepared as indicated by completion of said plurality of tasks;

automatically deploying said sounding device via said sounding device vehicle from within said single structure; and controlling said telemetry receiving antenna in response to said step of deploying wherein said means for controlling includes:

automatically orienting said telemetry receiving antenna to receive said telemetry from said sounding device; and overriding said step of automatically orienting said telemetry receiving antenna to manually orient said telemetry receiving antenna by a user input command to receive said telemetry from said sounding device.

12. The method of claim 11 wherein said step of managing includes:

displaying a coordinate format that is real-time selectable by a user between a polar coordinate format and a cartesian coordinate format wherein said polar coordinate format includes a real-time orientation indicator of said telemetry receiving antenna orientation relative to said telemetry from said sounding device;

superimposing said coordinate format with a user selectable color coding of historic navigational data and real-time navigational data indicative of wanderings of said sounding device;

overlaying real-time raw thermodynamic data from said sounding device onto said coordinate format in a user selectable form;

generating derivative data from said real-time navigational data and said raw thermodynamic data to correct errors and fill gaps in said real-time navigational data and said thermodynamic data; and integrating said derivative data into said real-time navigational data and said thermodynamic data.

13. The method of claim 12 including:

displaying said raw thermodynamic data said real-time navigational data, and said derivative data in a user selectable time frame selectable between real-time and prerecorded playback.

14. The method of claim 11 including:

incrementally releasing ballast from said sounding device when in flight to alter the rate of ascent of said sounding device.

15. The method of claim 14 including:

controlling a post-deployment release of said sounding device from said sounding device vehicle during ascent to allow said sounding device to descend to Earth while transmitting telemetry.

16. The method of claim 11, including:

verifying completion of each task in said sequence of said plurality of tasks.

17. The method of claim 11 including:

remotely manipulating said integrated control system to automatically deploy said sounding device.

18. The method of claim 11 including;

scheduling said deployment of said sounding device based on an event selected from the group consisting of a predetermined length of time, and occurrence of an event, and a overriding user command; and deploying said sounding device in response to said step of scheduling.

19. The method of claim 11 including;

configuring said sounding device to communicate with said telemetry receiving antenna; and conditioning said sounding device to external ambient conditions prior to deployment when said sounding device is fully enclosed within said single structure.

20. A method for preparing and deploying a sounding device and managing telemetry therefrom that is received by a telemetry receiving system, said method comprising the steps of:

controlling execution of a plurality of tasks inside a single structure to prepare a sounding device anti a sounding device vehicle for a deployment: wherein said step of controlling includes:

inputting a plurality of equipment parameters indicative of equipment used in a sounding;

defining a sequence of said plurality of tasks needed to prepare said sounding device for deployment in response to said step of inputting;

calibrating said sounding device; and verifying completion of each of said plurality of tasks in said sequence;

restraining said sounding device vehicle with in said single structure when said sounding device vehicle is fully prepared as indicated by completion of said plurality of tasks;

controlling deployment of said sounding device in response to said step of controlling execution of said plurality of tasks, wherein said step of controlling deployment includes:

scheduling said deployment of said sounding device selected from the group consisting of a predetermined length of time, an occurrence of an event, and an overriding real-time user command;

controlling reception of raw data transmitted from said sounding device in response to said step of controlling deployment wherein said step of controlling includes:

automatically orienting said telemetry receiving antenna to receive said telemetry from said sounding device; and     overriding said means for automatically orienting said telemetry receiving antenna to receive said telemetry from said sounding device by a user input command;

displaying said raw data from said sounding device on a user selectable coordinate format wherein said user selectable format is selectable in real-time between a polar coordinate format and a cartesian coordinate format;

deriving at least one virtual data value from said raw data; and displaying said at least one virtual data value concurrently with said raw data in a user selectable time frame selectable between real-time and prerecorded playback.

* * * * *